United States Patent
Shiflet

[15] 3,639,961
[45] Feb. 8, 1972

[54] METHOD AND TOOL FOR SECURING A BEARING RACE WITHIN A BORE IN A HOUSING

[72] Inventor: Robert H. Shiflet, Chula Vista, Calif.

[73] Assignee: Rohr Corporation, Chula Vista, Calif.

[22] Filed: Feb. 9, 1970

[21] Appl. No.: 9,865

[52] U.S. Cl. ...........................................29/149.5 B, 29/200
[51] Int. Cl. ...................................B23p 11/00, B23p 19/00
[58] Field of Search ..........29/149.5 B, 200 B, 149.5, 200 D, 29/200

[56] References Cited

UNITED STATES PATENTS 3,444,606  5/1969  Jones..............................29/149.5 B X

*Primary Examiner*—Thomas H. Eager
*Attorney*—George E. Pearson

[57] ABSTRACT

An annular shoulder which retains a bearing race in a bore in a housing is swaged by beveled rollers mounted on a rotatable spindle. Pressure exerted by the rollers against the shoulder is maintained at a first predetermined level during at least half of a revolution of the spindle, then is increased to a second predetermined level while the spindle continues to rotate, and finally is maintained at the second level during at least half of a revolution of the spindle. The bevel of the rollers, radius of their larger diameter edges, and distance between their inner sides are designed to provide proper swaging of the shoulder.

8 Claims, 4 Drawing Figures

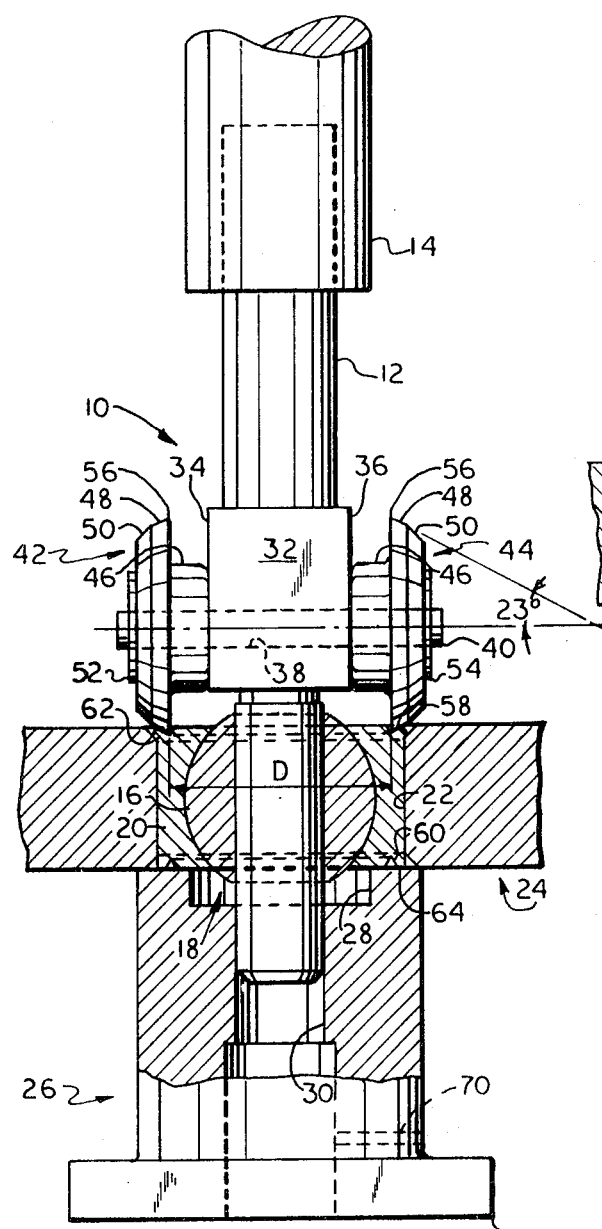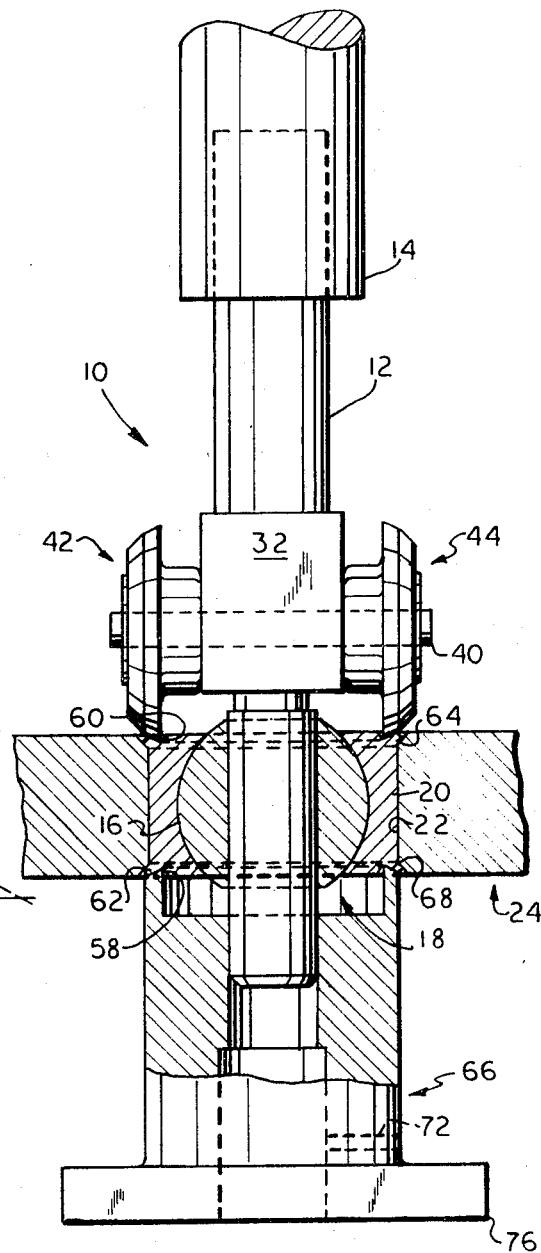
FIG. 1
FIG. 2
INVENTOR.
ROBERT H. SHIFLET

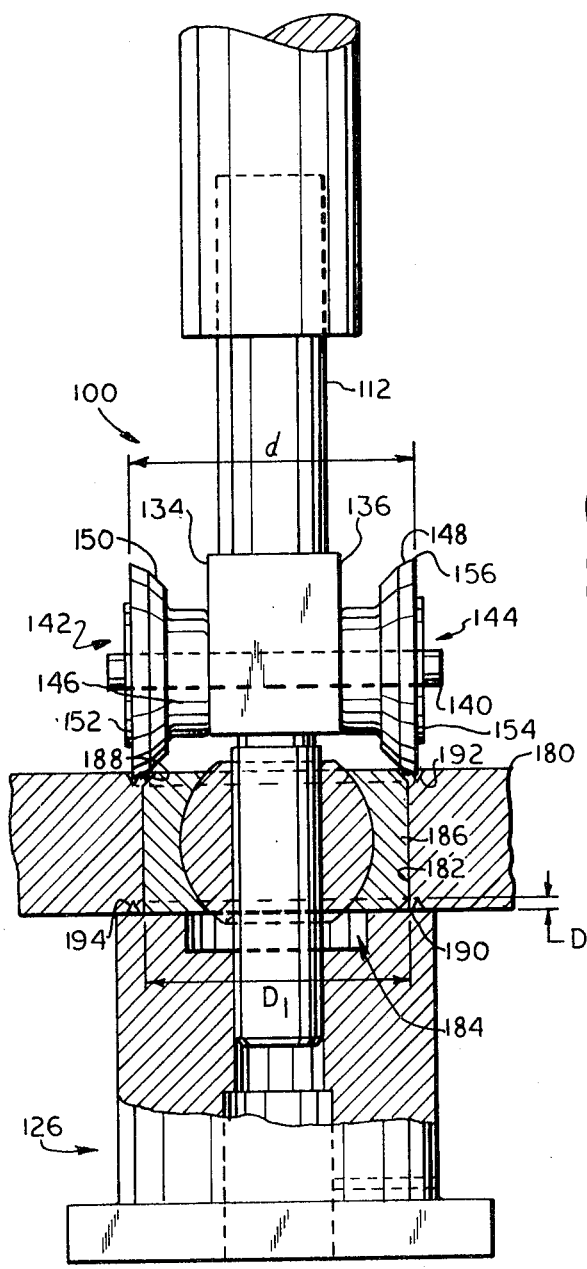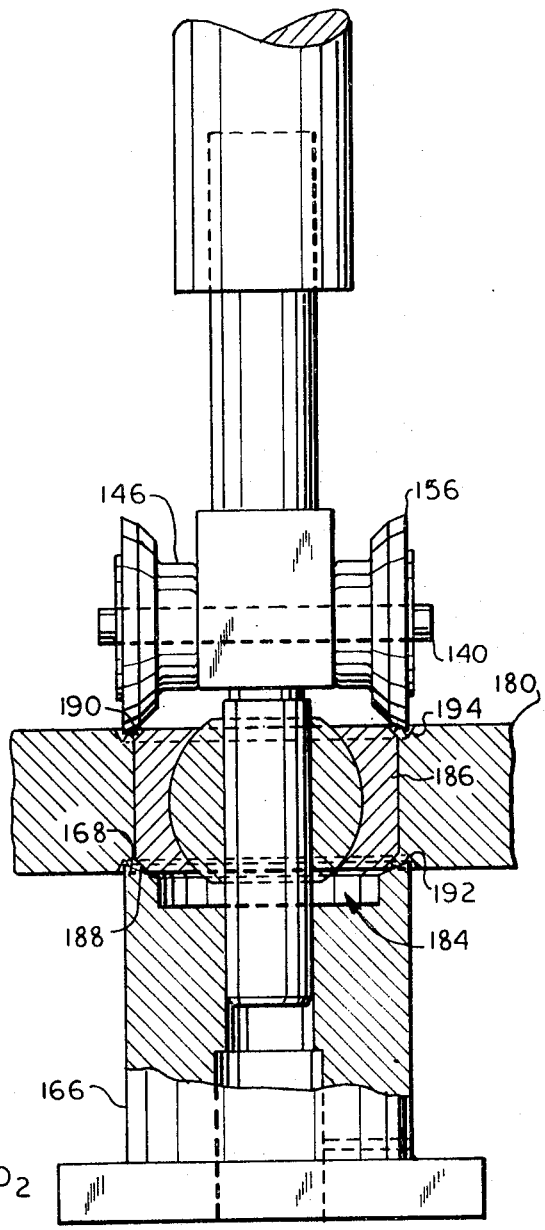
FIG. 3
FIG. 4
INVENTOR.
ROBERT H. SHIFLET 3,639,961

METHOD AND TOOL FOR SECURING A BEARING RACE WITHIN A BORE IN A HOUSING

BACKGROUND OF THE INVENTION

In modern aircraft a large number of parts are provided with spherical bearings the races of which are fixedly positioned within bores in various structures, hereinafter referred to as bearing housings. Often such a bearing has annular grooves formed in opposite sides of its race, and to hold the bearing within the bore of its housing the edge portions of said race which lie outside said grooves are swaged over chamfers formed on the edges of said bore. Also in some cases an annular groove is formed in a bearing housing in concentric relation with the edge of the bore in which a spherical bearing is to be seated, and the edge portion of said housing which lies between said groove and the wall of said bore is swaged over a chamfered edge on the bearing race. The development of large and powerful jet-propelled aircraft has required that both spherical bearings and bearing housings in such aircraft be made of high-strength alloys, and consequently great difficulty has been encountered in attempts to swage such bearings and housings by means of known roller swaging tools. More specifically, the use of roller swaging tools of the prior art in the swaging of spherical bearings and housings which are formed of high-strength alloys causes various unacceptable installation defects, including galling and distortion in the bearing races and cracking in the retaining lips of said races or their housings.

SUMMARY OF THE INVENTION

This invention relates to an improved roller swaging tool and method of its use. More particularly, by means of the tool and method disclosed herein annular shoulders on high-strength spherical bearings, or on their housings, can be deformed to thereby secure said components to one another without installation defects of the type heretofore mentioned.

In one swaging tool in accordance with the invention a pair of rollers are mounted on opposite sides of a spindle and arranged so that beveled surfaces thereof can be positioned against the outer wall of an annular, V-shaped groove formed in one side of the race of a spherical bearing, which race is adapted to fit with a bore in a bearing housing and is held therein by swaging over a chamfered edge of said bore the portion of said race which lies outside said groove. One end of the spindle is adapted to fit snugly within the inner, rotatable member of the bearing, and the spacing between the rollers of the swaging tool is set at a predetermined distance relative to the center-to-center diameter of the aforesaid groove in the bearing race. The larger diameter edges of the beveled swaging surfaces of the rollers have a selected radius of curvature which, in conjunction with the spacing between the rollers and the angle of their beveled swaging surfaces, enables the bearing race retaining shoulder to be swaged without installation defects when the swaging tool is used in the proper manner, which requires that (1) the rollers are initially pressed against said shoulder under a first predetermined pressure while the spindle is rotated at least half of a revolution about its longitudinal axis, (2) the pressure exerted against the shoulder is then increased to a second predetermined pressure while the rollers continue to roll around said shoulder, and (3) the rollers are rolled a predetermined distance around the shoulder while the second pressure is maintained.

DESCRIPTION OF THE DRAWINGS

FIG. 1 is an elevation of a first swaging tool in accordance with the invention, the drawing also illustrating in sectional form a spherical bearing and the housing therefor and in partially section form a support anvil for said bearing and housing.

FIG. 2 is another view of the first swaging tool, bearing, and housing shown in FIG. 1, the drawing illustrating a different support anvil for the bearing and a different position of said bearing and said housing.

FIG. 3 is an elevation of a second swaging tool in accordance with the invention, the drawing also illustrating in sectional form a spherical bearing and the housing therefore and in partially sectional form a support anvil for said bearing and housing.

FIG. 4 is another view of the second swaging tool, bearing, and housing shown in FIG. 3, the drawing illustrating a different support anvil for the bearing and a different position of said bearing and said housing.

DETAILED DESCRIPTION

First Embodiment

In FIG. 1 reference number 10 designates generally a swaging tool having a spindle 12 one end of which is adapted to be fixedly disposed within the apertured end of a rotatable ram 14 and the other end of which is slidable within the aperture in the rotatable member (or "ball") 16 of a spherical bearing 18. The race 20 of bearing 18 fits snugly within a bore 22 formed in the housing 24 for said bearing, and during a first swaging operation performed by tool 10 and described hereinafter, both said race and said housing are preferably supported upon the flat upper surface of a centrally apertured, cylindrical support anvil 26 which includes a counterbore 28 providing clearance for member 16. The end of spindle 12 which fits within the aperture in member 16 also fits snugly within a reduced diameter portion 30 of the aperture in anvil 26 when the swaging tool is positioned as illustrated in FIG. 1.

Intermediate its ends spindle 12 is formed with an integral portion 32 having flat surfaces 34, 36 which are equidistant from the longitudinal axis of the spindle and parallel thereto. An aperture 38 extends between these two surfaces and is aligned so that its longitudinal axis intersects the longitudinal axis of the spindle and is perpendicular thereto. A cylindrical roller support shaft 40 is mounted within aperture 38 and projects from each of the surfaces 34, 36, with beveled rollers 42, 44 being respectively rotatably engaged on the ends of said shaft at the same distance from the longitudinal axis of spindle 12. Each roller comprises a shoulder portion 46 which abuts the adjacent surface 34, 36, a circumferentially extending surface 48 which is inclined at an angle of 23° relative to the longitudinal axis of shaft 40, and another circumferentially extending surface 50 which is inclined at a greater angle relative to said axis and which may be omitted in some embodiments of the invention. Adjacent each end of shaft 40 is a circumferentially extending groove (not shown) which is adapted to receive the inner edge of an annular spring clip 52, 54 which engages the end surface of the adjacent roller 42, 44 and serves to hold the latter in proper position on said shaft.

The spacing between rollers 42, 44 is such that the distance between their inner sides (i.e., the surfaces which respectively extend from the shoulder portions 46 of said rollers to the large diameter edges 56 of their beveled surfaces 48 and which are perpendicular to the longitudinal axis of shaft 40) is about 0.005 inch (preferably with a tolerance of ±0.0005 inch) less than the center-to-center diameter of two annular, V-shaped grooves 58, 60 which are respectively formed on opposite sides of race 20 (said center-to-center diameter being designated D in FIG. 1 and being measured at the center of the slightly rounded bottoms of the V-shaped grooves). The walls of the grooves are inclined at an angle of 30° relative to the longitudinal axis of spindle 12, so that the included angle between the walls of each groove is 60°. The grooves are concentric with respect to the peripheral wall of race 20 and are spaced only a small distance inwardly from the chamfered edges thereof, thus defining an annular, peripheral shoulder 62, 64 on each side of said race. It is important that the radius of curvature of edge 56 of each roller be in the range of about 0.010 to about 0.015 inch.

Illustrated in FIG. 2 is a second support anvil 66 which differs from anvil 26 in that it is formed with a beveled end surface 68 inclined at an angle of 67° relative to the longitudinal axis of anvil 66. Each anvil 26, 66 is provided with an air vent hole 70, 72 which extends through the lower portion of the wall thereof, and is preferably also provided with a base portion 74, 76 having an increased diameter.

Tool 10 was developed during an extensive program directed toward elminating installation defects in high-strength bearing and housing assemblies of the type illustrated in FIGS. 1 and 2 (and also installation defects in bearing and housing assemblies wherein the edge of the bore in a housing is swaged, as in the assembly which is illustrated in FIGS. 3 and 4 and which will be described hereinafter). In housing 24 the chamfered edges of the bore 22 thereof are inclined at an angle of 45° relative to said bore (which is the conventional arrangement), and prior to the discovery of the invention disclosed herein great difficulty was encountered in attempts to swage, or deform, the shoulders 62, 64 of a high-strength spherical bearing race against such chamfered bore edges without distorting the race and binding the rotatable member 16 therein, galling the grooves 58, 60 which define said shoulders, or cracking the shoulders themselves. A factor which has been found critical to the design of a roller-type tool which can swage an annular shoulder on a bearing race or housing without causing defects of the aforedescribed type is the location of the large diameter edges 56 of the rollers of said tool relative to the center of a V-shaped groove into which the rollers are pressed to swage said shoulder. Other critical factors are the radius of curvature of said large diameter edge 56 and the angle of inclination of the swaging surface 48 of the rollers. In accordance with the invention, an improved swaging tool 10, for use in deforming a shoulder defined on one side of a race by an annular, V-shaped groove therein, is arranged as described hereinbefore, namely, the swaging surfaces 48 of its rollers 42, 44 are inclined at an angle of 23° relative to the longitudinal axis of the shaft 48 on which the rollers are mounted, the radius of curvature of the large diameter edge 56 of each swaging surface is within the range of about 0.010 to about 0.015 inch, and the inner sides of said rollers which extend from edges 56 are equidistant from and parallel to the longitudinal axis of spindle 12 and the spacing therebetween is 0.005 inch (plus or minus 0.0005 inch) less than the center-to-center diameter of said groove. Furthermore, the thickness of the bearing race (i.e., the distance between the surfaces in which grooves 58 and 60 are formed) should be equal to, or not more than 0.010 inch greater than, the thickness of the housing, and the width of the chamfers on said housing (i.e., the horizontal distance in FIG. 1 between the inner and outer edges of one of said chamfers) and the depth of each groove in said bearing race should be as specified in the following table:

TABLE I

| Bearing Race Groove Depth | Housing Chamfer Width |
|---|---|
| 0.015–0.030 inch | 0.010–0.020 inch × 45° |
| 0.025–0.040 inch | 0.020–0.030 inch × 45° |
| 0.045–0.060 inch | 0.025–0.035 inch × 45° |

In accordance with the invention the procedure for installing a high-strength spherical bearing 18 in the bore 22 of a housing 24 is as follows. The groove 58 in one side of the race of the bearing is lubricated with a suitable lubricant, such as that specified as MIL–G–21164 grease. The race of the bearing is centered relative to the sides of the housing, as by supporting both the race and the housing on the flat end of anvil 26. Ram 14 is lowered to insert the lower end of spindle 12 within the aperture in member 16 of the bearing and within portion 30 of the aperture in said anvil 26, thus aligning the spindle in coaxial relation with the race and bringing the swaging surfaces 48 of rollers 42 and 44 against diametrically opposed points on the inner edge of shoulder 62. With a first predetermined pressure exerted axially upon the swaging tool 10 by means of ram 14, the spindle 12 of said tool is rotated at least half of a revolution about its longitudinal axis. The pressure exerted against the spindle is then increased to a second predetermined level as the spindle continues to rotate. To minimize work-hardening of shoulder 62 the spindle should

TABLE II

| Bearing manufacturer | Bearing part number | Initial load | | Maximum load | |
|---|---|---|---|---|---|
| | | Pounds | P.s.i. | Pounds | P.s.i. |
| Heim Universal Corp | 3-246-7 | 450 | 225 | 1,100 | 350 |
| U.S. Bearing | HSP8-112 | 450 | 225 | 1,100 | 350 |
| Transport Dynamics | 55564 | 450 | 225 | 1,100 | 350 |
| Heim Universal Corp | NG-6AH | 350 | 240 | 850 | 315 |
| Fafnir | WFBUIZAZH28-1 | 350 | 240 | 850 | 315 |
| Transport Dynamics | 55565 | 350 | 240 | 850 | 315 |
| U.S. Bearing | HSP6-106 | 350 | 240 | 850 | 315 |
| Heim Universal Corp | LHSSG-4AF | 225 | 230 | 500 | 265 |
| Fafnir | WSBU8AZH20-1 | 225 | 230 | 500 | 265 |
| Transport Dynamics | 55566 | 225 | 230 | 500 | 265 |
| U.S. Bearing | HSP4-105 | 225 | 230 | 500 | 265 |
| Kahr | KWB4-20CRG | 250 | 235 | 550 | 270 |
| Transport Dynamics | 55282 | 250 | 235 | 550 | 270 |
| U.S. Bearing | HU4-134 | 250 | 235 | 550 | 270 |
| Astro | AW4V CRG | 250 | 235 | 550 | 270 |
| Southwest | BSSR 4804 | 250 | 235 | 550 | 270 |
| Kahr | KWB5-20CRG | 250 | 235 | 700 | 290 |
| Transport Dynamics | 55283 | 250 | 235 | 700 | 290 |
| U.S. Bearing | HU5-134 | 250 | 235 | 700 | 290 |
| Astro | AW5V CRG | 250 | 235 | 700 | 290 |
| Southwest | BSSR 5544 | 250 | 235 | 700 | 290 |
| Kahr | KSSBLO-32 | 750 | 300 | 1,500 | 410 |
| Transport Dynamics | 55491 | 750 | 300 | 1,500 | 410 |
| Kahr | KSSB20-33 | 1,000 | 335 | 2,100 | 490 |
| Transport Dynamics | 55490 | 1,000 | 335 | 2,100 | 490 |
| Military Std | MS21230-5 | 250 | 235 | 700 | 290 |
| Heim Universal Corp | LHSSG-4AK | 175 | 225 | 475 | 260 |
| Kahr | KSSB 30-8 | 350 | 240 | 800 | 310 |
| Transport Dynamics | 55532 | 350 | 240 | 800 | 310 |
| Heim Universal Corp | LHSSG-6AL | 250 | 235 | 550 | 270 |
| Astro | AW6V CRG | 350 | 240 | 800 | 310 |
| Kahr | KWB6-20CRO | 350 | 240 | 800 | 310 |
| Southwest | BSSR 6341 | 350 | 240 | 800 | 310 |
| Transport Dynamics | 55284 | 350 | 240 | 800 | 310 |
| U.S. Bearing | HUG-134 | 350 | 240 | 800 | 310 |
| Kahr | KSSB22-12 | 1,000 | 335 | 2,100 | 490 |
| Transport Dynamics | 55492 | 1,000 | 335 | 2,100 | 490 |
| Heim Universal Corp | LHSSG-5AN | 250 | 235 | 600 | 280 |
| Do | LHSSG-4AE | 250 | 235 | 550 | 270 |
| Fafnir | FBS8-3 | 250 | 235 | 550 | 270 |
| Transport Dynamics | 55567 | 250 | 235 | 550 | 270 |
| Industrial Tectonics | K4-2248 | 250 | 235 | 550 | 270 |
| U.S. Bearing | HSP4-106 | 250 | 235 | 550 | 270 | not be rotated more than three revolutions while the pressure applied to it is being increased. After the pressure has reached the second level the spindle is rotated at least half of a revolution, but preferably no more than two revolutions, and then the pressure applied to the spindle is immediately relieved. It is important to keep the spindle rotating after swaging of shoulder 62 is initiated. As the foregoing steps are carried out the shoulder is displaced radially of bearing 18 so that it abuts the chamfer on the edge of the bore 22 of housing 24. However, the edges 56 of rollers 42 and 44 do not bottom in groove 58.

The housing and bearing assembly is then turned over and the race of the bearing is supported on the beveled end surface of anvil 66, which surface is inclined at the proper angle to engage the inner side of shoulder 62 after it has been swaged. Shoulder 64 of the race is thereafter swaged against the other chamfered edge of bore 22 by repeating the steps used to swage shoulder 62.

The initial and maximum pressures which are required to swage the shoulders of different bearings will depend upon such factors as the size of the bearing, the material of which its race is made, and the width of the shoulders 62, 64, thereon. For the purpose of illustration, the initial and maximum pressures which are satisfactory for use with particular spherical bearings are listed in Table II Second Embodiment The swaging tool 100 which is illustrated in FIGS. 3 and 4 is identical to the above-described tool 10 except for the arrangement of its rollers 142, 144. In FIG. 3 reference number 126 designates a support anvil which corresponds to anvil 26 of FIG. 1, reference number 180 designates generally a bearing housing formed with a bore 182, and reference number 184 designates generally a spherical bearing the race 186 of which is different from the race 20 of the aforedescribed bearing 18. More particularly, in the bearing and housing assembly which is illustrated in FIGS. 3 and 4 the peripheral edges of race 186 are chamfered at an angle of 45° relative to the sides of said race (which is the conventional arrangement in installations wherein the swaging shoulders are on the bearing housing instead of the bearing race), and annular shoulders 188, 190 are defined on opposite sides of housing 180 by annular, V-shaped grooves 192, 194 which are concentric to bore 182 and respectively located near the edges thereof. As in the case of grooves 58 and 60 on race 20 of FIG. 1, the bottoms of grooves 192 and 194 are slightly rounded. Each roller 142, 144 is formed with a shoulder portion 146 which abuts an adjacent flat surface 134, 136 on spindle 112, a circumferentially extending surface 148 which is inclined at an angle of 23° relative to the longitudinal axis of the roller support shaft 140, and another circumferentially extending surface 150 which is inclined at a greater angle relative to said axis and which may be omitted in some embodiments of the invention. As in the arrangement of tool 10, rollers 142, 144 are held in proper position on their support shaft by annular spring clips 152, 154 the inner edges of which are respectively engaged in grooves extending circumferentially of said shaft. The swaging surfaces 148 of rollers 142 and 144 converge toward spindle 112 whereas the swaging surfaces 48 of rollers 42 and 44 of swaging tool 10 diverge toward their supporting spindle 12. The large diameter edge 156 of each roller 142, 144 has a radius of curvature within the range of about 0.010 to about 0.015 inch (as in the case of the large diameter edges of rollers 42 and 44 of tool 10), and the outer sides of said rollers are parallel with the longitudinal axis of spindle 112 and equidistant therefrom.

If housing 180 is made of a relatively soft metal, swaging tool 100 may be used to displace the edges of bore 182 over the chamfered edges of race 186 even though no V-shaped grooves 192, 194 are formed in the sides of said housing adjacent said bore edges. However, if the housing is made of a high-strength alloy it is necessary to provide grooves 192, 194 which define shoulders 188, 190 adjacent the edges of bore 182, and it has been found preferable to make the center-to-center diameter of each groove equal to $D_1$ plus $2D_2$, where $D_1$ is the nominal outside diameter of race 186 (i.e., the dimension midway between the allowable minimum and maximum outside diameters of said race) and $D_2$ is the width of the chamfers on said race (i.e., the horizontal distance in FIG. 3 between the inner and outer edges of the chamfers on the race). The distance "d" (see FIG. 3) between the outer sides of rollers 142 and 144 should be $D_1$ plus $2D_2$ plus 0.005 inch (plus or minus 0.0005 inch). In addition, the thickness of housing 180 should be equal to, or not more than 0.010 inch greater than, the thickness of race 186, and the width of the chamfers on said race and the depth of each groove in said housing should be as specified in the following table:

TABLE III

| Housing Groove Depth | Bearing Race Chamfer Width |
| --- | --- |
| 0.015–0.030 inch | 0.010–0.020 inch × 45° |
| 0.025–0.040 inch | 0.020–0.030 inch × 45° |
| 0.045–0.060 inch | 0.025–0.035 inch × 45° |

The method of using tool 100 is the same as that described in connection with tool 10 and thus it is not considered necessary to repeat the steps involved. After one shoulder 188 has been swaged against the chamfered edge of race 186, the housing and bearing assembly is turned over and said housing is supported on a second anvil 166 the upper end surface 168 of which is inclined at an angle of 67° relative to the longitudinal axis of said anvil and which is thus adapted to abut shoulder 188 after the latter has been swaged. The predescribed swaging steps are then repeated to swage shoulder 190 against the other chamfered edge of race 186.

In some bearing and housing installations only one shoulder has to be swaged in order to retain the race of the bearing within the bore of the housing, a flange being formed on the race of the bearing which fits within a recess circumscribing the edge of the bore at one end thereof or a flange being formed on the housing at one end of the bore and projecting over the periphery of the bearing. The method and tools which have been disclosed are of course applicable for swaging the single shoulder of such installations.

As various modifications of the disclosed embodiments of the invention will be obvious in view of the teachings thereof, the scope of the invention should be considered to be limited only by the terms of the claims appended hereto.

What is claimed as new and useful and desired to be secured by U.S. Letters Patent is:

1. A tool for securing a bearing race within a bore in a housing by swaging a shoulder defined on one of said race and said housing by an annular groove having a substantially V-shaped cross section comprising:
    a spindle one end of which fits snugly within the rotatable member of said bearing;
    a shaft fixedly mounted on said spindle, the longitudinal axes of said shaft and spindle intersecting at a right angle; and
    a pair of beveled rollers respectively mounted on said shaft on opposite sides of said spindle, said rollers being beveled at an angle of about 23° relative to the longitudinal axis of said shaft and the radius of their large diameter edges being in the range of about 0.010 to about 0.015 inch.

2. A tool as defined in claim 1 wherein said shoulder and groove are on said race and the distance between the inner sides of said rollers is about 0.005 inch less than the center-to-center diameter of said groove.

3. A tool as defined in claim 1 wherein said groove is on said housing and said shoulder is swaged against a 45° chamfer on said bearing race, the center-to-center diameter of said groove is equal to $D_1$ plus $2D_2$ where $D_1$ is the nominal outside diameter of said race and $D_2$ is the width of the chamfers on said race, and the distance between the outer sides of said rollers is equal to $D_1$ plus $2D_2$ plus about 0.005 inch.

4. In the process wherein a bearing race is secured within a bore in a housing by swaging a shoulder defined on one of said race and said housing by an annular groove having a substantially V-shaped cross section and wherein said swaging is effected by a tool comprising a spindle one end of which fits snugly within the rotatable member of said bearing, a shaft mounted on said spindle in perpendicular relation therewith, and a pair of beveled rollers respectively mounted on said shaft on opposite sides of said spindle, the steps of:

pressing said rollers against said shoulder under a first predetermined pressure and simultaneously rotating said spindle at least half of a revolution about its longitudinal axis;

increasing the pressure exerted by said rollers against said shoulder to a second predetermined pressure while continuing to rotate said spindle; and thereafter rotating said spindle at least half of a revolution about its longitudinal axis while said rollers are pressed against said shoulder under said second pressure.

5. The process of claim 4 wherein said spindle is rotated at least three revolutions about its longitudinal axis while said rollers are pressed against said shoulder under said second pressure.

6. The process of claim 4 wherein said rollers are beveled at an angle of about 23° relative to the longitudinal axis of said shaft and the radius of their large diameter edges is in the range of about 0.010 to about 0.015 inch.

7. The process of claim 6 wherein said shoulder and groove are on said race and the distance between the inner sides of said rollers is about 0.005 inch less than the center-to-center diameter of said groove.

8. The process of claim 6 wherein said groove is on said housing and said shoulder is swaged against a 45° chamfer on said bearing race, the center-to-center diameter of said groove is equal to $D_1$ plus $2D_2$ where $D_1$ is the nominal outside diameter of said race and $D_2$ is the width of the chamfers on said race, and the distance between the outer sides of said rollers is equal to $D_1$ plus $2D_2$ plus about 0.005 inch.

* * * * *